Nov. 23, 1937.  W. M. SPENCER  2,099,774
POULTRY OR LIVESTOCK VEHICLE BODY
Filed May 1, 1935  3 Sheets-Sheet 1
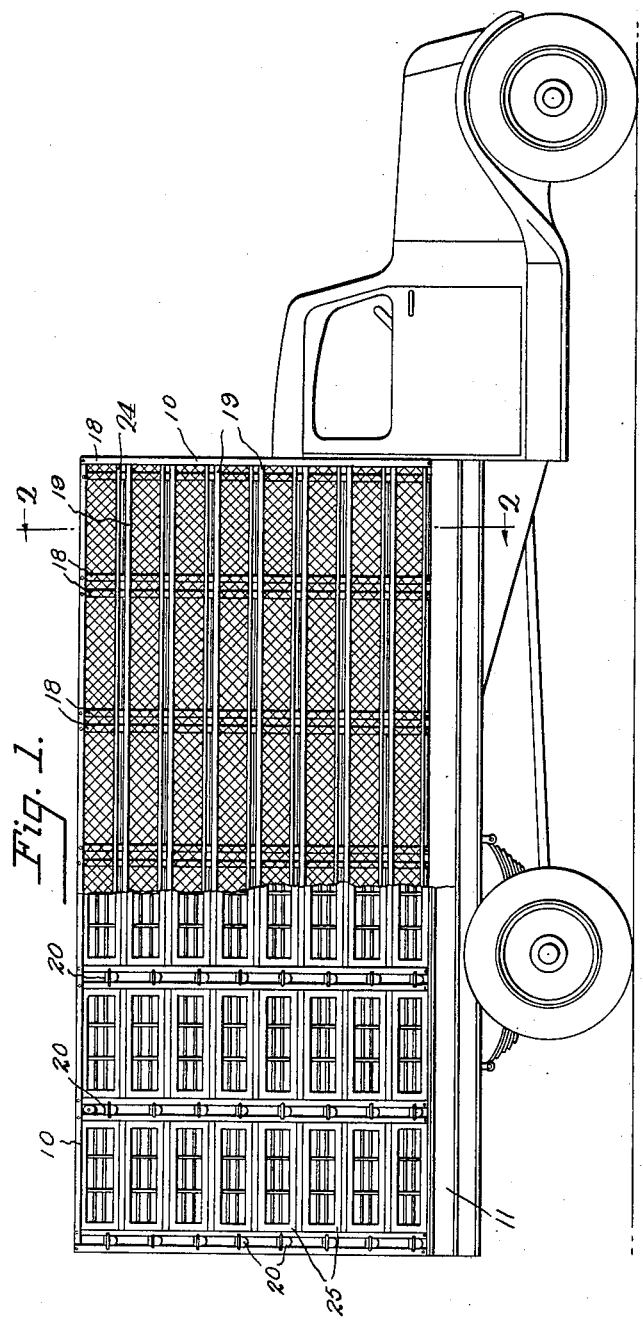
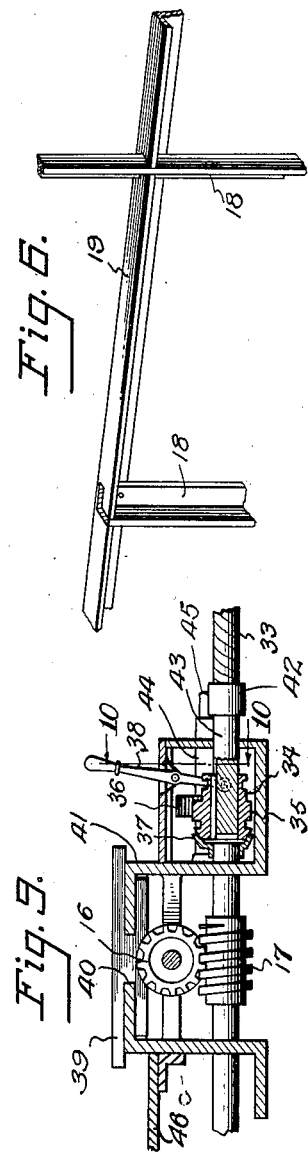
Inventor
Will Murrell Spencer,
By Thomas Addleman
Attorney

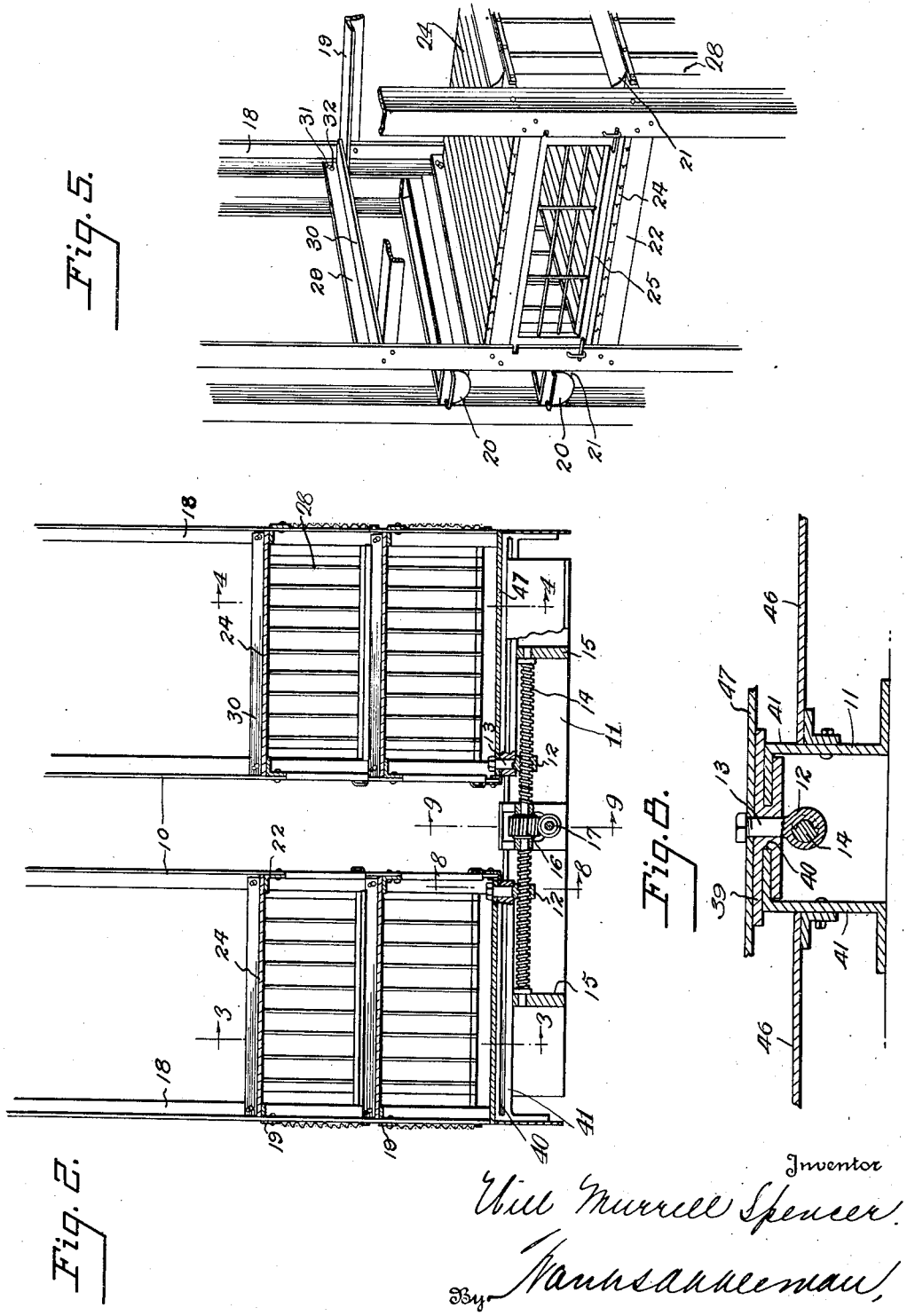

Nov. 23, 1937.  W. M. SPENCER  2,099,774
POULTRY OR LIVESTOCK VEHICLE BODY
Filed May 1, 1935   3 Sheets-Sheet 3
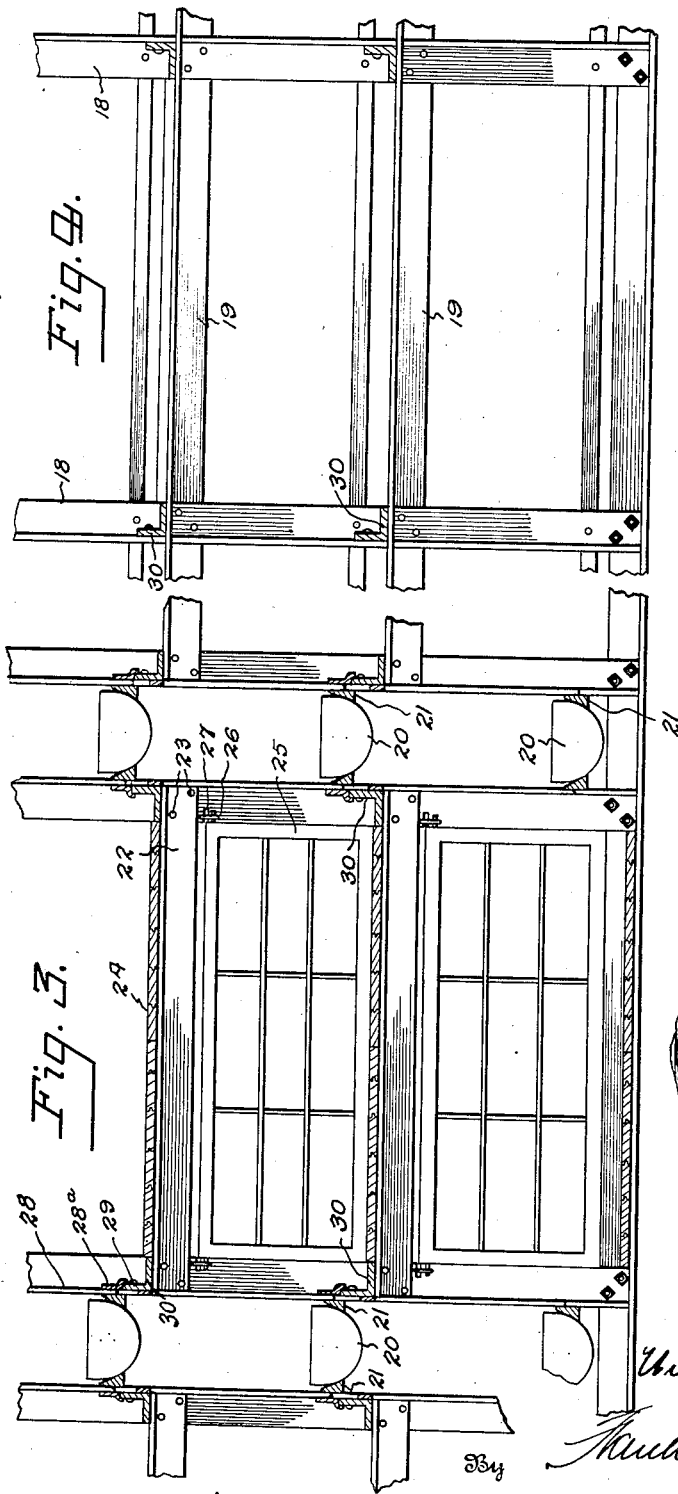
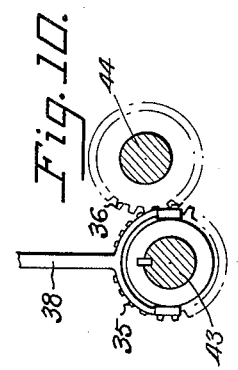
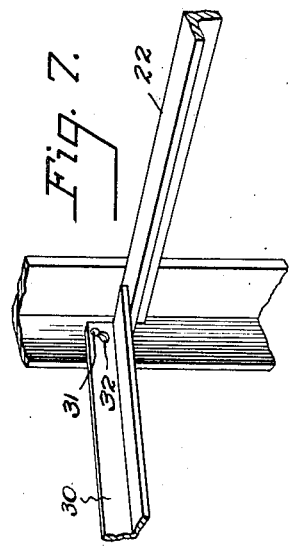

Patented Nov. 23, 1937

2,099,774

UNITED STATES PATENT OFFICE 2,099,774

POULTRY OR LIVESTOCK VEHICLE BODY

Will M. Spencer, Estill Springs, Tenn.

Application May 1, 1935, Serial No. 19,307

3 Claims. (Cl. 119—12)

This invention relates to truck bodies, the same being particularly designed for carrying poultry, eggs and produce, and an object of the inventor is to produce a body sectional in character, the sections of which are displaceable transversely of the chassis, and includes operative means for accomplishing the adjustment.

One object of the invention is the provision of means for feeding and watering stock or poultry in transportation, and another object is to provide a structure which can be altered to accommodate small or large stock. Fowl, such as chickens, require a relatively low headroom, as compared with that required for turkeys in transit and therefore, provision is made for convenient and expeditious manipulation of parts of the carrier to accomplish the foregoing results.

Furthermore, the sections of the body are movable in opposite directions from the center and an aisle is provided thereby, through which food and water may be carried and delivered to the several coops or containers in which the poultry is confined; and the invention furthermore includes watering troughs whose ends face the aisle, which troughs extend transversely to the outer edge of each section of the body, and means are provided for removably supporting the troughs in order that they may be displaced for cleaning them, or for other purposes.

A still further object of the invention is to provide mechanism which may be manually or power driven for effecting the movement of the sections from their normal positions to the positions in which they are separated for feeding and, of course, by the same means they are returned to their normal positions.

With the foregoing and other obects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of a body embodying the invention, a portion thereof being broken away;

Figure 2 illustrates a transverse sectional view on the line 2—2 of Fig. 1 of the sectional body, showing the means for adjusting the sections;

Figure 3 illustrates a longitudinal sectional view on the line 3—3 of Figure 2, of a fragment of the body;

Figure 4 illustrates a view of a fragment of the frame structure;

Figure 5 illustrates a perspective view of a fragment of the body;

Figure 6 illustrates a perspective view of a fragment of the frame;

Figure 7 illustrates a perspective view of a fragment of the frame in another location;

Figure 8 illustrates a detail sectional view on the line 8—8 of Figure 2, of the central sill of the frame and parts associated with it;

Figure 9 illustrates a detail view, partly in section taken on the line 9—9 of Figure 2, showing the manner of applying power for operating the sections; and Figure 10 illustrates a sectional view on the line 10—10 of Figure 9.

The carrying body comprises two main sections such as 10, each of which is preferably continuous from end to end, and each of which consists of a unit, separable one from the other.

Any appropriate understructure 11 may be provided on which the sections 10 are slidable, and each section is preferably provided with one or more threaded members 12 depending and suitably secured to the section by fastenings such as 13. The threaded members for each section are engaged by worms 14 rotatably mounted in bearing members 15, the worms having their ends attached in suitable manner to and taking motion from a worm wheel 16 which is driven by a worm 17 extending longitudinally of the structure and it is obvious that when the worm is turned, the sections 10 will be moved transversely of the understructure 11. It is the purpose of the inventor that the sections 10 shall be separated, as they are shown in Fig. 2, to provide a passage for an attendant who may feed and water the stock and that thereafter the worm will be rotated to move the sections together so that the carrier will be of practically the same width as the chassis on which it is mounted.

Each transversely movable section has an outside frame formed by the upright members 18, preferably of angle iron, the said uprights being connected by longitudinally extending bars 19 having slots in their horizontal flanges to conform to the cross sectional shape of the members 18 whereby the bars 19 may slide over and be attached to said vertically disposed members. The upright members are arranged in what may be termed "pairs", the uprights of each pair being separated a distance corresponding to the length of each cage or coop section and the pairs of uprights are spaced from succeeding pairs a suitable distance corresponding approximately to the width of the troughs 20, which are supported on cleats or suitable devices such as 21, and the said supports 21 are preferably attached to a closing frame and removable therewith, as will presently appear, and preferably the troughs are removable transversely of the sections when they are separated.

The pairs of uprights have bars or angle irons 22 and 19 attached to their flanges by fastenings 23, such as rivets or the like, and these form the support for the outer end of the floor 24 which is made in two sections so that it may easily pass between the uprights when being put in place and which is removable in order that headroom may be provided in the event the body is used for large poultry.

The inner frame section comprises uprights and connecting members similar to those which form the outer frame section, and the space between the floors of the several cages is closed by a door 25 suspended by a bracket 26 and pins 27 from the floor supporting bar of the cage or section thereabove. Above the intersection of the floor supporting bars and the upright frame members, provision is made for attaching closures 28 for the ends of the sections, which closures preferably consist of spaced bars attached to a frame 28ª, and the lower member of each frame is inwardly flanged to overlap and interlock with a flange such as 29 of an angle iron 30. The angle irons 30 are removably attached to the inner and outer uprights by means of a pin and slot connection, the pin 31 being carried by one of the flanges of the upright and the slot 32 being provided in the flange 29. It is seen from the drawings, Fig. 7, that the slot is enlarged at its lower end and that the restricted portion thereof engages the stud at the time the angle iron 30 is resting on the members 19 and 22. In order that the angle iron can be applied to the studs, the said angle iron is of less length than the distance between the uprights to which it is attached.

By reason of the arrangement, the floors, doors and closures 28, together with the trough supports and the troughs, can be removed and the interior of the carriers will be practically unobstructed for the loading therein of egg crates or other more bulky merchandise.

While any suitable means may be employed to operate the worm shaft 17, Figs. 9 and 10 show a power transmitting means for this purpose. A flexible shaft 33, connected to a source of power such as the motor of the truck, is removably secured in a coupling 42 on a shaft 43. Slidably mounted on the shaft 43 and keyed thereto is a clutch member 34 adapted to engage the cone clutch 37 fixed upon the end of the worm shaft 17. The sliding clutch member 34 is provided with a gear 35 engaging another gear 36 mounted on a stub shaft 44. The stub shaft 44 has at its outer end a coupling 45, identical to the coupling 42. A suitable lever 38 serves to move the clutch members 34 into or out of engagement with the clutch 37. When the flexible shaft 33 is secured in the coupling 42 and the clutch is engaged, the worm shaft will be operated to separate the sections of the truck body. When it is desired to close the sections of the body, the flexible shaft is removed from the coupling 42 and secured in the coupling 45. The drive is then reversed through the gears 36 and 35. It is, of course, evident that a hand crank may be substituted for the flexible shaft 33 if the truck structure is light enough to permit manual operation.

Secured to the bottom flooring 47 of the sections 10 by means of the threaded members 12 and the fastening means 13 are the carriers 39. These carriers are provided with slots 40 extending along their longitudinal edges to receive the slide on horizontal flanges formed on the transverse slide members 41.

Extending longitudinally down the center of the truck and secured to the transverse slide members 41 is a cat walk 46 which provides a flooring or walk to be used by the attendant in feeding or caring for the poultry.

I claim:

1. In a poultry or livestock vehicle body, a suitable base, body sections mounted thereon to move transversely of the base, each of said sections comprising an outer frame including pairs of uprights and superimposed spaced members connecting the uprights and constituting floor supports, inner frame members comprising pairs of uprights, floor supporting members connecting the pairs of last mentioned uprights, a removable floor for each section composed of the two pairs of uprights and their connecting members, removably applied members extending between the outer uprights and the inner uprights of each section, a barred frame removably applied to the space between the outer and inner frame sections and each two floor supporting members, and means attached thereto and engaging the members between the uprights for retaining the barred frames in place, means for closing the outer frame, and doors between the floor supports of the inner frame.

2. In a poultry or livestock vehicle body, a suitable base, body sections mounted thereon, means for moving the body sections apart centrally of the base to produce a space therebetween for feeding, each of said sections comprising pairs of posts at the outer side of said section and pairs of posts at the inner side of said section, longitudinally extending members connecting the posts of each pair of constituting floor supports, each pair of posts being spaced apart from the next pair of posts, feeding troughs removably held in the spaces between the pairs of posts, removable members between the outer and inner posts of each pair, a closing frame removably secured to the said removable members and having spaced bars for closing the space therebetween, means for closing the outer frame, floor members for each section, and doors between the floor supports of the inner frame.

3. In a poultry and livestock vehicle body, transversely movable sections, each having an outside frame comprising upright members arranged in pairs, the said pairs being separated to produce spaces, longitudinally extending angle bars having horizontally disposed flanges slotted to receive the upright members whereby the outer frames are assembled, the said section also having an inner frame comprising pairs of upright members in spaced relation to said other pairs of upright members, feeding troughs displaceably supported in the spaces between the pairs and movable transversely of the section, angle irons attached to the uprights of each section of the inner frame and constituting with the longitudinally extending bars of the outer frame a floor support, a sectional floor removably applied to the said supports, angle irons extending from the upright members of the outer frame to the upright members of the inner frame transversely of the section and engaging the floor supporting members of the frame, a door for each compartment at the inner side of each section and a closure for the outer side of each section, closures for the ends of compartments between floors, and means for removingly attaching them to the members between the outer and inner upright frame members.

WILL M. SPENCER.